(12) United States Patent
Gomi et al.

(10) Patent No.: US 7,866,029 B2
(45) Date of Patent: Jan. 11, 2011

(54) METHOD FOR FORMING A PATTERN FILM WITH A NARROWER WIDTH

(75) Inventors: Hirotaka Gomi, Chuo-ku (JP); Mitsuharu Isobe, Chuo-ku (JP); Noriyuki Ito, Chuo-ku (JP); Hiroaki Funada, Chuo-ku (JP); Takeshi Yamana, Chuo-ku (JP); Makoto Terasawa, Chuo-ku (JP); Yasuhiro Hasegawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 909 days.

(21) Appl. No.: 11/723,946

(22) Filed: Mar. 22, 2007

(65) Prior Publication Data

US 2007/0223141 A1   Sep. 27, 2007

(30) Foreign Application Priority Data

Mar. 24, 2006 (JP) ............................. 2006-082673
Dec. 22, 2006 (JP) ............................. 2006-345740

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 216/62; 216/65; 216/66; 360/121; 360/122; 360/317; 451/5; 451/41

(58) Field of Classification Search .............. 29/603.07, 29/603.13–603.16, 63.18; 216/62, 65, 66; 360/121, 122, 317; 427/127, 128; 451/5, 451/41

See application file for complete search history.

(56) References Cited

U.S. PATENT DOCUMENTS 7,452,795 B2 * 11/2008 Iba .............................. 438/597

FOREIGN PATENT DOCUMENTS

| JP | 10-241125 | 9/1998 |
|----|-----------|--------|
| JP | 2002-324304 | 11/2002 |
| JP | 2003-263705 | 9/2003 |

* cited by examiner

*Primary Examiner*—Paul D Kim
(74) *Attorney, Agent, or Firm*—Frommer Lawrence & Haug LLP

(57) ABSTRACT

A method for forming a pattern film with a narrower width than the resolution of an exposure machine and a resist used independently of etching is provided. The method comprises the steps of: forming a first frame layer having end surfaces facing each other across a space having a width $W_1$; forming a second frame layer having end surfaces facing each other across a space having a width $W_2$ that is larger than the width $W_1$, the space having the width $W_2$ being located right above the space having the width $W_1$; forming a trench-forming film provided with a trench having a minimum width $W_3$ that is smaller than the width $W_1$ so as to fill at least a part of the spaces having the width $W_1$ and the width $W_2$ respectively; and forming a pattern film so as to fill at least a part of the trench.

6 Claims, 8 Drawing Sheets

TRACK WIDTH DIRECTION

METHOD FOR FORMING A PATTERN FILM WITH A NARROWER WIDTH

PRIORITY CLAIM

This application claim priorities from Japanese patent application No. 2006-82673, filed on Mar. 24, 2006, and Japanese patent application No. 2006-345740, filed on Dec. 22, 2006, which are incorporated herein by reference.

BACKGROUND OF THE INVENTION

1. Field of the Invention

The present invention relates to a forming method of a pattern film with a narrower width. The present invention further relates to a manufacturing method of a thin-film element having such a pattern film with a narrower width as a component, and more particularly, to a manufacturing method of a thin-film magnetic head used for magnetic recording. The present invention further relates to a thin-film magnetic head provided with a magnetic pole layer with such a narrower width.

2. Description of the Related Art

In recent years, with a demand for an increasingly large capacity and small size in magnetic disk drive apparatuses, further improvement of recording density is becoming indispensable. In order to realize a still higher recording density, it is indispensable to further narrow a track width of an upper magnetic pole layer of a head for longitudinal magnetic recording and a main magnetic pole layer of a head for perpendicular magnetic recording. Various experiments and development have been carried forward in pursuit for a forming method of the upper magnetic pole layer or the main magnetic pole layer capable of meeting such demands.

For example, Japanese Patent Publication No. 10-241125A and Japanese Patent Publication No. 2002-324304A describes a method of forming an upper magnetic film on a lower magnetic film and a gap film, by using a frame plating method, performing a dry etching method with this upper magnetic film as a mask, and forming an upper/lower magnetic film and a gap film having a predetermined width in a track width direction (hereinafter abbreviated as a "track width"). Here, Japanese Patent Publication No. 10-241125A includes a description that the track width is generally determined by a frame interval and an excellent manufacturing of a track width of up to 0.5 μm has been confirmed. Furthermore, Japanese Patent Publication No. 2002-324304A includes a further description that the track width is reduced to 0.5 μm or below by performing trimming using ion milling.

Furthermore, Japanese Patent Publication No. 2003-263705A discloses a method of providing a main magnetic pole of a magnetic head for perpendicular magnetic recording by forming a magnetic film using a frame plating method and then forming a reverse tapered shape (reverse trapezoidal shape) using ion milling. Furthermore, this Japanese Patent Publication No. 2003-263705A includes a description that a track width of 0.15 to 0.17 μm could be finally formed by ion milling.

As described above, according to the conventional forming method, the track width of the upper magnetic pole layer or the main magnetic pole layer is defined with a pattern interval provided by a photolithography method such as a resist frame in principle. This track width actually has a lower limit of approximately 0.2 μm due to a limitation of resolution of an exposure machine and resist normally in use. It is an actual situation that realizing a narrower width requires further etching with use of ion milling or the like as shown in Japanese Patent Publication No. 2003-263705A.

However, narrowing of the track width with use of etching also has a limitation and there may be also a problem with deterioration of a magnetic characteristic of the upper magnetic pole layer or the main magnetic pole layer due to etching.

In order to respond to a demand for a higher recording density, the track width of the upper magnetic pole layer or the main magnetic pole layer is required to be set to 0.15 μm or less. However, even when realizing the narrowing using an etching method such as ion milling, since an extremely fine pattern is already used before etching, it is extremely difficult to perform etching adequately while maintaining a desired shape. Furthermore, the magnetic characteristic deteriorates when the surface of the upper magnetic pole layer or the main magnetic pole layer receives impact from ions or the like.

Moreover, since the track width and the shape of the upper magnetic pole layer or the main magnetic pole layer is a very important parameter which determines intensity and distribution of the writing magnetic field (write field), they should be defined according to the intended design by using predetermined patterning without additional etching process as much as possible. Furthermore, even when ion beam etching or the like is used, the degree of etching should preferably be reduced to a minimum.

BRIEF SUMMARY OF THE INVENTION

Therefore, it is an object of the present invention to provide a forming method of a pattern film which can form a pattern film with a narrower width than the resolution of an exposure machine and a resist used independently of etching.

It is another object of the present invention to provide a manufacturing method of a thin-film magnetic head capable of forming a magnetic pole layer having a narrower track width than the resolution of an exposure machine and a resist used, independently of etching.

It is a further object of the present invention to provide a thin-film magnetic head provided with a magnetic pole layer having a narrower track width than the resolution of an exposure machine and a resist used.

Before explaining the present invention, terms used in the specification will be defined. In a stacked structure of a magnetic head element formed on an element forming surface of a substrate, suppose a component located closer to the substrate than a layer which serves as a reference is located "below/under" the reference layer or "lower" than the reference layer, and a component located on the stacking direction side of the reference layer is located "on/above" the reference layer or "upper" than the reference layer. For example, "a lower magnetic pole layer is on an insulating layer" means that the lower magnetic pole layer is located on the stacking direction side of the insulating layer.

According to the present invention, a forming method of a pattern film with a narrower width is provided, which comprises the steps of:

forming a base layer on/above an element forming surface of a substrate;

forming a first frame layer having end surfaces facing each other across a space having a width $W_1$ on the base layer;

forming a second frame layer having end surfaces facing each other across a space having a width $W_2$ in the same direction as the width $W_1$ which is larger than the width $W_1$, the space having the width $W_2$ being located right above the space having the width $W_1$;

forming a trench-forming film provided with a trench having a minimum width $W_3$ which is smaller than the width $W_1$ in the same direction as the width $W_1$ so as to fill at least a part of the space having the width $W_1$ and the space having the width $W_2$; and forming a pattern film so as to fill at least a part of the trench.

According to this manufacturing method, since the trench-forming film is provided under the condition of the existence of the special first and second frame layers, the minimum width $W_3$ of the trench can be set to be much smaller than the width $W_1$ defined by the resolution of an exposure machine and a resist used. Therefore, it becomes possible to form a pattern film having a width narrower than the resolution of the exposure machine and the resist used without depending on etching.

According to the present invention, a manufacturing method of a thin-film magnetic head is further provided, which comprises the steps of:

forming a base layer on/above an element forming surface of a substrate;

forming a first frame layer made of a non-magnetic material, having end surfaces facing each other across a space having a width $W_1$ in a track width direction on the base layer;

forming a second frame layer made of a non-magnetic material, having end surfaces facing each other across a space having a width $W_2$ in the track width direction which is larger than the width $W_1$, the space having the width $W_2$ being located right above the space having the width $W_1$;

forming a trench-forming film made of a non-magnetic material, provided with a trench having a minimum width $W_3$ in the track width direction which is smaller than the width $W_1$ so as to fill at least a part of the space having the width $W_1$ and the space having the width $W_2$;

forming a pattern film made of a soft magnetic material so as to fill at least a part of the trench; and polishing the pattern film by using a chemical mechanical polishing (CMP) method to form a main magnetic pole layer.

According to this manufacturing method, since the trench-forming film is provided under the condition of the existence of the special first and second frame layers, the minimum width $W_3$ of the trench can be set to be much smaller than the width $W_1$ defined by the resolution of an exposure machine and a resist used. Therefore, it becomes possible to form a main magnetic pole layer having a narrower track width than the resolution of the exposure machine and the resist used without depending on trimming by ion milling or the like. This makes it possible to manufacture a thin-film magnetic head for perpendicular magnetic recording in response to increasingly higher recording densities than the conventional one.

In the above-described manufacturing method, the first frame layer, the second frame layer and the trench-forming film are preferably formed by depositing Alumina or silicon dioxide with a sputtering method.

According to the present invention, a manufacturing method of a thin-film magnetic head is further provided, which comprises the steps of:

forming a base layer on/above an element-forming surface of a substrate;

forming a first frame layer made of a soft magnetic material, having end surfaces facing each other across a space having a width $W_1$ in a track width direction on the base layer;

forming a second frame layer made of a soft magnetic material, having end surfaces facing each other across a space having a width $W_2$ in the track width direction which is larger than the width $W_1$, the space having the width $W_2$ being located right above the space having the width $W_1$;

forming a trench-forming film made of a non-magnetic material, provided with a trench having a minimum width $W_3$ in the track width direction which is smaller than the width $W_1$ so as to fill at least a part of the space having the width $W_1$ and the space having the width $W_2$;

forming a pattern film made of a soft magnetic material so as to fill at least a part of the trench; and polishing the pattern film by using a CMP method to form a main magnetic pole layer.

According to this manufacturing method, a side shield structure is constructed, in which the main magnetic pole layer is sandwiched between the first and second frame layers in the track width direction. As a result, the writing magnetic flux becomes more perpendicular to the recording medium, and therefore it becomes possible to prevent unnecessary writing to an adjacent track.

Further, in this manufacturing method, the first frame layer and the second frame layer are preferably formed by plating a soft magnetic material with a frame plating method, and the trench-forming film is preferably formed by depositing alumina or silicon dioxide with a sputtering method. Furthermore, the pattern film is preferably formed by using a plating method while applying a magnetic field in the track width direction from outside.

Further, in the above-described manufacturing methods of the thin-film magnetic head, it is preferable that a ratio $W_2/W_1$ of the width $W_2$ and the width $W_1$ is not less than 1.1 and not more than 1.5, and that a ratio $t_2/t_1$ of a layer thickness $t_2$ of the second frame layer and a layer thickness $t_1$ of the first frame layer is not less than 1.2 and not more than 2.3.

According to the present invention, a manufacturing method of a thin-film magnetic head is further provided, which comprises the steps of:

forming a base layer made of a soft magnetic material on/above an element forming surface of a substrate to provide a lower magnetic pole layer;

forming a first frame layer made of a non-magnetic material, having end surfaces facing each other across a space having a width $W_1$ in a track width direction on the base layer;

forming a second frame layer made of a non-magnetic material, having end surfaces facing each other across a space having a width $W_2$ in the track width direction which is larger than the width $W_1$, the space having the width $W_2$ being located right above the space having the width $W_1$;

forming a trench-forming film made of a non-magnetic material, provided with a trench having a minimum width $W_3$ in the track width direction which is smaller than the width $W_1$ so as to fill at least a part of the space having the width $W_1$ and the space having the width $W_2$, a portion on the lower magnetic pole layer of the trench-forming film provided as a write gap portion;

forming a pattern film made of a soft magnetic material so as to fill at least a part of the trench; and polishing the pattern film by using a CMP method to form a upper magnetic pole layer.

According to this manufacturing method, since the trench-forming film is provided under the condition of the existence of the special first and second frame layers, it becomes possible to set the minimum width $W_3$ of the trench to be smaller than the width $W_1$ defined by the resolution of an exposure machine and a resist used. Therefore, it becomes possible to form the upper magnetic pole layer having a narrower track width than the resolution of the exposure machine and the resist used without depending on trimming by ion milling or the like. This makes it possible to manufacture a thin-film magnetic head for longitudinal magnetic recording in response to increasingly higher recording densities than the conventional one.

Further, in this manufacturing method, the first frame layer, the second frame layer and the trench-forming film are preferably formed by depositing alumina or silicon dioxide with a sputtering method.

According to the present invention, a thin-film magnetic head is further provided, which comprises:

a substrate having an element forming surface;

a first frame layer made of a non-magnetic material, formed on the element forming surface and having end surfaces facing each other across a space having a width $W_1$ in a track width direction;

a second frame layer made of a non-magnetic material, formed on the first frame layer, and having end surfaces facing each other across a space having a width $W_2$ in the track width direction which is larger than the width $W_1$, the space having the width $W_2$ being located right above the space having the width $W_1$;

a trench-forming film made of a non-magnetic material, comprising a trench with a minimum width $W_3$ which is smaller than the width $W_1$ in the track width direction so as to fill at least a part of the space having the width $W_1$ and the space having the width $W_2$; and a magnetic pole layer made of a soft magnetic material, formed so as to fill at least a part of the trench.

According to the present invention, a thin-film magnetic head is further provided, which comprises:

a substrate having an element forming surface;

a first frame layer made of a soft magnetic material formed on the element forming surface, and having end surfaces facing each other across a space having a width $W_1$ in a track width direction;

a second frame layer made of a soft magnetic material, formed on the first frame layer, and having end surfaces facing each other across a space having a width $W_2$ which is larger than the width $W_1$ in the track width direction, the space having the width $W_2$ being located right above the space having the width $W_1$;

a trench-forming film made of a non-magnetic material, provided with a trench having a minimum width $W_3$ which is smaller than the width $W_1$ in the track width direction so as to fill at least a part of the space having the width $W_1$ and the space having the width $W_2$; and a magnetic pole layer made of a soft magnetic material formed so as to fill at least a part of the trench.

In this thin-film magnetic head, the magnetic pole layer is preferably made of a magnetic film formed by using a plating method while applying a magnetic field in the track width direction from outside.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIGS. 3a and 3b are schematic diagrams showing the end of the electromagnetic coil element on the head end surface in FIG. 2a;

FIGS. 6a to 6d are schematic diagrams viewed from the head end surface side, illustrating the forming process of the main magnetic pole layer of the electromagnetic coil element for perpendicular magnetic recording in FIG. 2a;

DETAILED DESCRIPTION OF THE INVENTION

Figure 1:
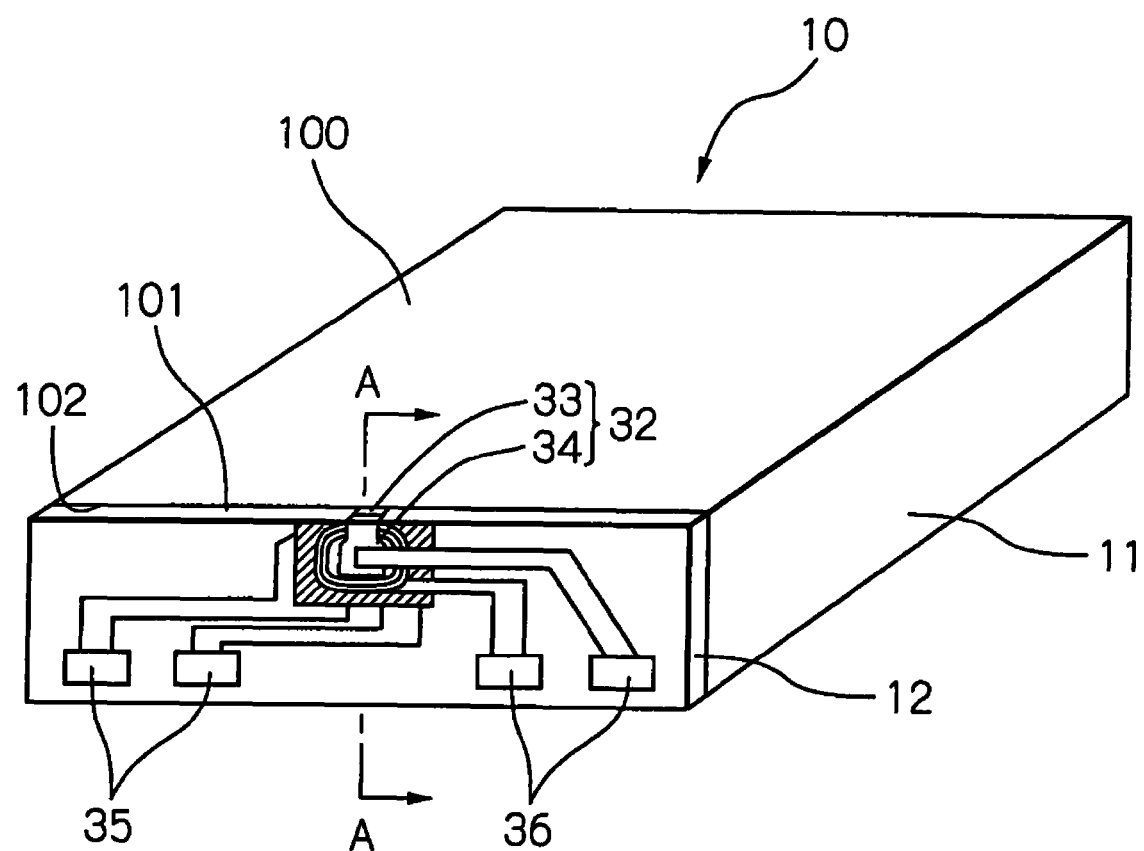
FIG. 1 is a perspective view showing one embodiment of a thin-film magnetic head manufactured by using a manufacturing method according to the present invention.

FIG. 1 is a perspective view showing one embodiment of a thin-film magnetic head manufactured by using a manufacturing method according to the present invention.

According to FIG. 1, a thin-film magnetic head 10 is provided with a slider substrate 11 having an air bearing surface (ABS) 100 for obtaining an appropriate amount of flying height and an element forming surface 102, a magnetic head element 32 formed on/above the element forming surface 102 and signal electrodes 35 and 36 each made up of two electrodes exposed from the layer surface of an overcoat layer 12 formed on the element forming surface 102. Here, the magnetic head element 32 is constructed of a magnetoresistive (MR) effect element 33 for data reading and an electromagnetic coil element 34 for data writing. Moreover, the signal electrodes 35 and 36 are connected to the MR effect element 33 and the electromagnetic coil element 34 respectively.

In the MR effect element 33 and the electromagnetic coil element 34, one ends of the element reach a head end surface 101 on the ABS 100 side. These ends are located opposed to the magnetic disk, and reading by sensing a signal field and writing by applying a signal field are thereby performed. Though not shown, the head end surface 101 is coated with diamondlike carbon (DLC) or the like as an extremely thin protective film.

Figure 2A:
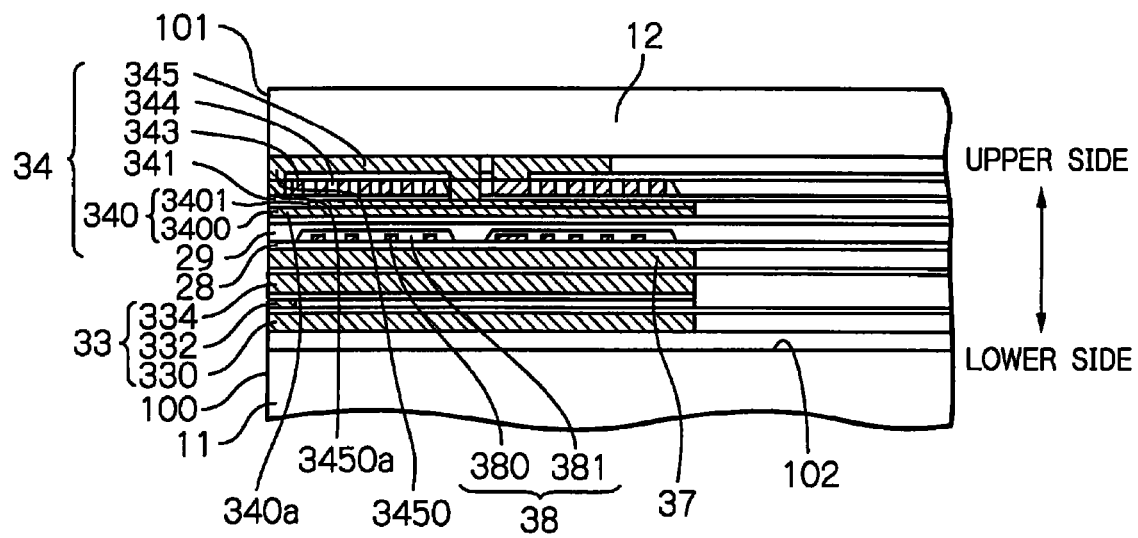
FIG. 2a is a cross-sectional view along an A-A line of FIG. 1 showing a main part of the thin-film magnetic head when the head of FIG. 1 is provided with an electromagnetic coil element for perpendicular magnetic recording.
Figure 2B:
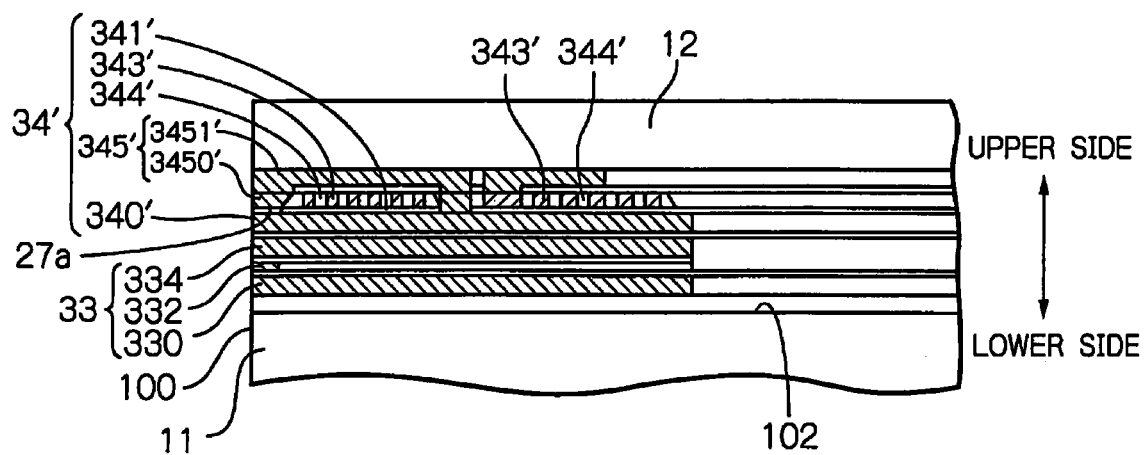
FIG. 2b is a cross-sectional view along an A-A line of FIG. 1 showing a main part of the thin-film magnetic head when the head of FIG. 1 is provided with an electromagnetic coil element for longitudinal magnetic recording.

FIG. 2a is a cross-sectional view along an A-A line of FIG. 1 showing a main part of the thin-film magnetic head when the head of FIG. 1 is provided with an electromagnetic coil element for perpendicular magnetic recording. Furthermore, FIG. 2b is a cross-sectional view along an A-A line of FIG. 1 showing a main part of the thin-film magnetic head when the head of FIG. 1 is provided with an electromagnetic coil element for longitudinal magnetic recording. In FIG. 2b, components common to or corresponding to those of the magnetic head element of FIG. 2a are shown by using the same reference numerals as those in FIG. 2a and the explanations of the configurations thereof are omitted.

In FIG. 2a, reference numeral 11 denotes a slider substrate, which has an ABS 100 to be opposed to the surface of a magnetic disk. The MR effect element 33 for reading, the magnetic coil element 34 for writing and the overcoat layer 12 which protects these components are mainly formed in the element forming surface 102 which is one side surface when the ABS 100 of the slider substrate 11 is considered as the bottom surface.

The MR effect element 33 includes an MR effect multilayer 332, and a lower shield layer 330 and an upper shield layer 334 arranged at positions sandwiching this MR effect multilayer. The MR effect multilayer 332 includes a Current-In-Plane (CIP) giant magnetoresistive (GMR) multilayered film, a Current-Perpendicular-to-Plane (CPP) GMR multilayered film or a tunnel magnetoresistive (TMR) multilayered film and senses a signal field from the magnetic disk with very high sensitivity. The upper and lower shield layers 334 and 330 prevent the MR effect multilayer 332 from receiving an outside magnetic field that becomes noise.

When this MR effect multilayer 332 includes a CIP-GMR multilayered film, upper and lower shield gap layers for insulation are provided between MR effect multilayer 332 and the upper and lower shield layers 334 and 330 respectively. Furthermore, an MR lead conductor layer to supply a sense current to the MR effect multilayer 332 and to extract the reproduction output is formed in the MR effect multilayer 332. On the other hand, when the MR effect multilayer 332 includes a CPP-GMR multilayered film or a TMR multilayered film, the upper and lower shield layers 334 and 330 also function as the upper and lower electrodes, respectively. In this case, the upper and lower shield write gap layers and the MR lead conductor layer are unnecessary and are omitted. However, insulating layers are formed between the shield layers on the opposite side to the head end surface 101 in relation to the MR effect multilayer 332. Further, and a bias means for applying a bias field to the MR effect multilayer 332 may be provided on both sides of the MR effect multilayer 332 in the track width direction.

In the same figure, the electromagnetic coil element 34 is intended for perpendicular magnetic recording and is provided with a main magnetic pole layer 340, a gap layer 341, a write coil layer 343, a coil insulating layer 344 and an auxiliary magnetic pole layer 345. The main magnetic pole layer 340 is a magnetic path for guiding and converging magnetic flux excited by the write coil layer 343 to a perpendicular magnetic recording layer of the magnetic disk on which data is written, and is constructed of a main pole principal layer 3400 and a main pole auxiliary layer 3401. Here, the length (thickness) in the layer thickness direction of an end portion 340a of the main magnetic pole layer 340 on the head end surface 101 side is reduced in correspondence with the layer thickness of this main pole principal layer 3400 only. As a result, it is possible to generate a fine write field in response to increasingly higher recording densities.

The end portion of the auxiliary magnetic pole layer 345 on the head end surface 101 side constitutes a trailing shield portion 3450 having a wider layer section than other parts of the auxiliary magnetic pole layer 345. Providing this trailing shield portion 3450 causes the gradient of the magnetic field between an end portion 3450a of the trailing shield portion 3450 and the end portion 340a of the main magnetic pole layer 340 to become steeper. As a result, jitter of a signal output becomes smaller making it possible to reduce the error rate during read operation. In the same figure, the write coil layer 343 is made up of one layer, but may be made up of two or more layers, or a helical coil.

In FIG. 2a, an inter-element shield layer 37 and a backing coil portion 38 interposed between a first insulating layer 28 and a second insulating layer 29 are further formed between the MR effect element 33 and the electromagnetic coil element 34. The backing coil portion 38 is formed of a backing coil layer 380 and a backing coil insulating layer 381, and is intended to generate magnetic flux for canceling out a magnetic flux loop which is generated from the electromagnetic coil element 34 and goes through the upper and lower shield layers in the MR effect element 33, and for suppressing a wide adjacent track erase (WATE) phenomenon which is an unnecessary write or erasure operation on the magnetic disk. The magnetic flux from the backing coil portion 38 also acts so as to weaken the write field. Therefore, to limit this action to within an allowable range, the number of turns of the backing coil layer 380 is set to be equivalent or smaller than the number of turns of the coil layer 343.

Next, another embodiment of the thin-film magnetic head according to the present invention will be explained using FIG. 2b.

An electromagnetic coil element 34' is intended for longitudinal magnetic recording and is provided with a lower magnetic pole layer 340', a write gap portion 27a, a write gap layer 341', a write coil layer 343', a coil insulating layer 344' and an upper magnetic layer 345'. The write coil layer 343' is formed so as to pass at least between the lower magnetic pole layer 340' and the upper magnetic layer 345'. The lower magnetic pole layer 340' and the upper magnetic layer 345' serve as magnetic paths of magnetic flux excited by the write coil layer 343'. Here, the upper magnetic layer 345' is provided with an upper magnetic pole layer 3450' and an upper yoke layer 3451' whose end on the head end surface 101 side is located on the upper magnetic pole layer 3450'. Here, a saturated magnetic flux density of the upper magnetic pole layer 3450' is greater than that of the upper yoke layer 3451' and is at least 2.0 T.

The lower magnetic pole layer 340' and the upper magnetic pole layer 3450' sandwich the write gap portion 27a. This sandwiched write gap portion 27a reaches a head end surface 101, and writing to a magnetic disk for longitudinal magnetic recording is performed with a leakage magnetic field from this position. In the same figure, the write coil layer 343' is made up of one layer, but may be made up of two or more layers, or a helical coil.

Furthermore, a non-magnetic layer made of an insulating material or metallic material to separate the MR effect element 33 from the electromagnetic coil element 34' is provided between the upper shield layer 334 and the lower magnetic pole layer 340', but the same layer is not always necessary and may be omitted and the lower magnetic pole layer may be used as a dual-purpose layer for the upper shield layer.

Figure 3A:
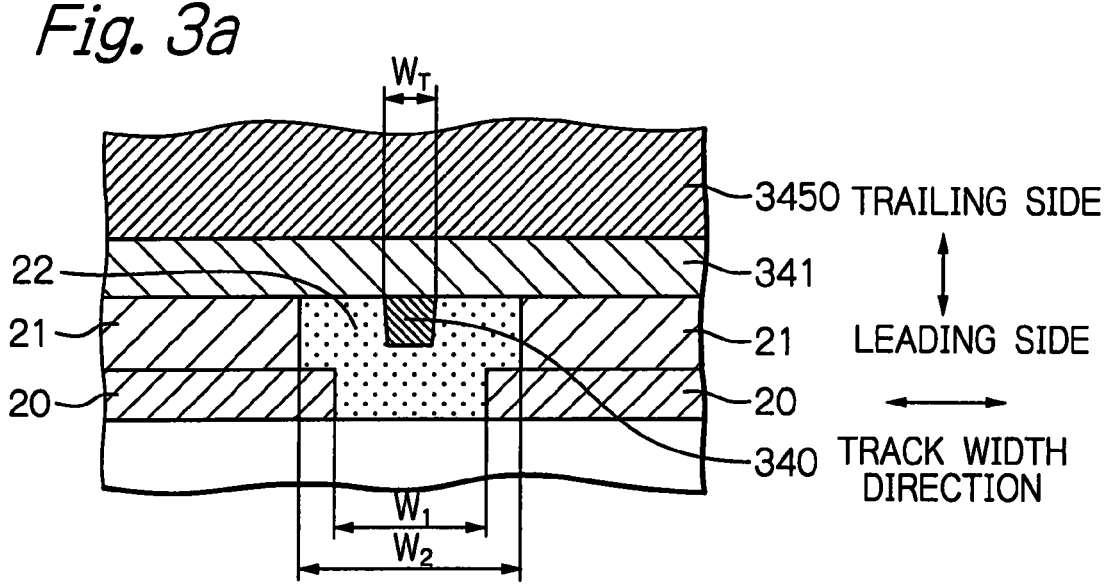
Figure 3B:
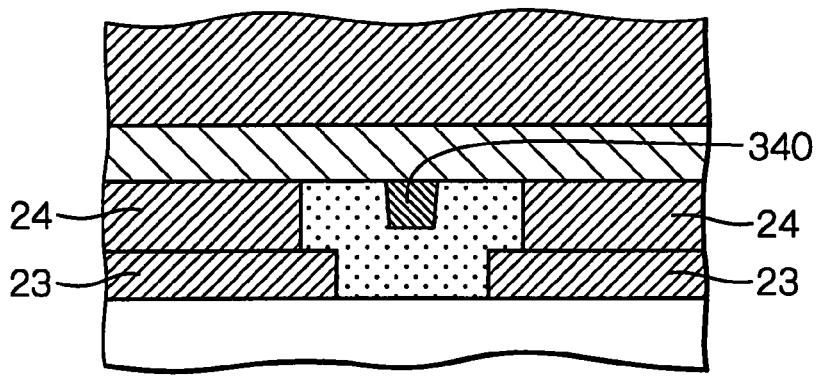
Figure 3C:
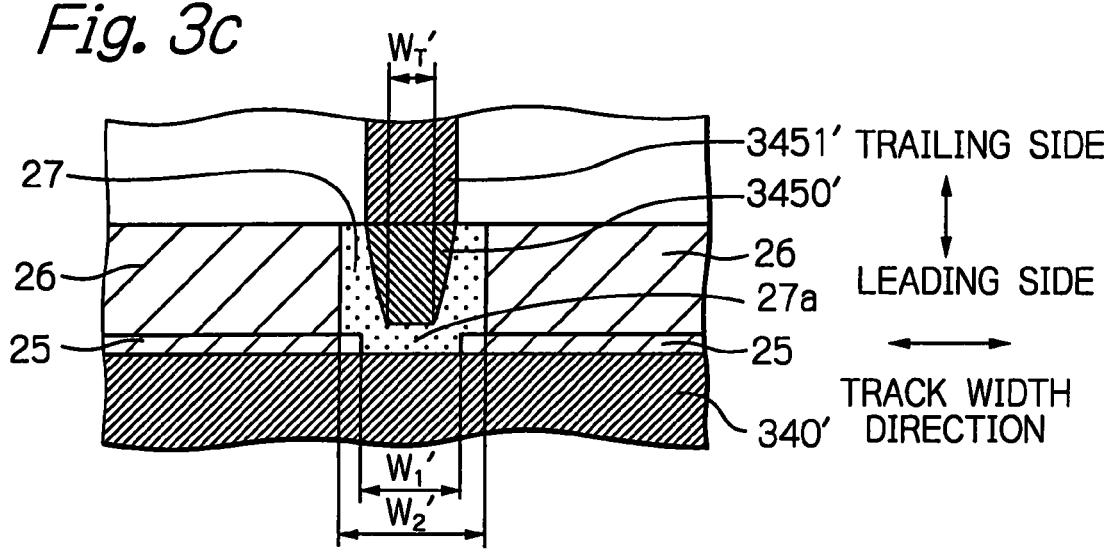
FIG. 3c is a schematic diagram showing the end of the electromagnetic coil element on the head end surface in FIG. 2b.

FIGS. 3a and 3b are schematic diagrams showing the end of the electromagnetic coil element 34 on the head end surface 101 in FIG. 2a. Furthermore, FIG. 3c is a schematic diagram showing the end of the electromagnetic coil element 34' on the head end surface 101 in FIG. 2b.

According to FIG. 3a, the main magnetic pole layer 340 has a reverse trapezoidal shape in which the edge on the trailing side becomes the longer edge on the head end surface, and the main magnetic pole layer 340 and the trailing shield portion 3450 of the auxiliary magnetic pole layer are opposed to each other across the gap layer 341. The reverse trapezoidal shape of this main magnetic pole layer 340 is intended to prevent unnecessary writing to an adjacent track caused by a skew angle of the head. Furthermore, the length $W_T$ of the longer edge of this reverse trapezoid becomes the track width of the main magnetic pole layer 340.

Furthermore, the main magnetic pole layer 340 is surrounded by an insulating layer 22 except the trailing side thereof. Moreover, the insulating layer 22 surrounding the main magnetic pole layer 340 is sandwiched by an insulating layer 20 and an insulating layer 21 having a width $W_1$ and a width $W_2$ respectively. Here, respective widths satisfy a relationship of $W_2 > W_1 > W_T$. That is, according to the manufacturing method of the present invention which will be explained in detail later, the track width $W_T$ of the main magnetic pole layer 340 can be set to be further smaller than the width $W_1$ defined by the resolution of the exposure machine and the resist used. As a result, it is possible to manufacture a thin-film magnetic head for perpendicular magnetic recording corresponding to a higher recording density than the conventional one.

Next, another mode of the end of the electromagnetic coil element 34 will be shown. According to FIG. 3b, side shield layers 23 and 24 made of a soft magnetic material are provided instead of the insulating layers 20 and 21 in FIG. 3a. Such side shield layers 23 and 24 are provided on both sides of the main magnetic pole layer 340 in the track width direction, and therefore the write field thereby reaches the recording medium more straightforward from the end of the main magnetic pole layer 340. That is, the writing magnetic flux becomes more perpendicular to the recording medium. As a result, it is possible to prevent unnecessary writing to an adjacent track.

According to FIG. 3c, the lower magnetic pole layer 340' and the upper magnetic pole layer 3450' are opposed to each other across the write gap portion 27a of the insulating layer 27 on the head end surface. Furthermore, the upper magnetic pole layer 3450' except its trailing side is surrounded by the insulating layer 27. Moreover, the insulating layer 27 surrounding the upper magnetic pole layer 3450' is sandwiched by an insulating layer 25 and an insulating layer 26 having a width $W_1'$ and a width $W_2'$ respectively. Assuming that the track width of the upper magnetic pole layer 3450' is $W_T'$ here, the respective widths satisfy a relationship of $W_2' > W_1' > W_T'$. That is, according to the manufacturing method of the present invention which will be explained in detail later, the track width $W_T'$ of the upper magnetic pole layer 3450' can be set to be smaller than the width $W_1'$ which is defined by the resolution of the exposure machine and the resist used. As a result, it is possible to manufacture the thin-film magnetic head for longitudinal magnetic recording corresponding to increasingly higher recording densities than the conventional one.

When the thin-film magnetic head is manufactured by using the manufacturing method of the present invention, the above described configuration, especially the configuration having the insulating layers 20, 21 and 22 in FIG. 3a, the configuration having the side shield layers 23 and 24 in FIG. 3b and the configuration having the insulating layers 25, 26 and 27 in FIG. 3c can be confirmed through an observation using, for example, a scanning electron microscope (SEM).

Figure 4:
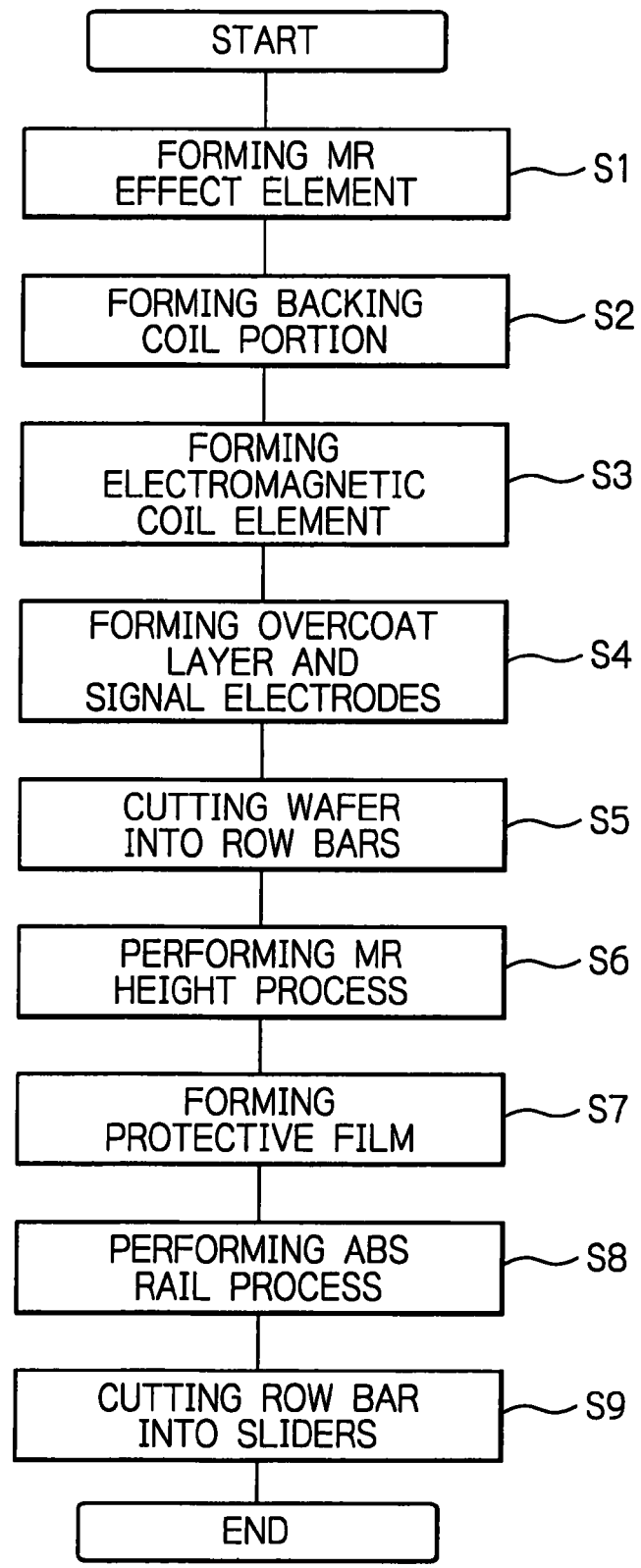
FIG. 4 is a flow chart schematically showing one embodiment of the manufacturing method of the thin-film magnetic head according to the present invention.

FIG. 4 is a flow chart schematically showing one embodiment of the manufacturing method of the thin-film magnetic head according to the present invention.

According to FIG. 4, first, the MR effect element for reading data is formed on/above the element forming surface of a wafer substrate for a slider (step S1) and the backing coil portion is then formed (step S2). Here, the backing coil portion is a component of the thin-film magnetic head for perpendicular magnetic recording and is omitted in the case of manufacturing the thin-film magnetic head for longitudinal magnetic recording. The electromagnetic coil element for writing data is then formed (step S3). The present invention has a special feature in the formation of the magnetic layer in this forming process of the electromagnetic coil element. Next, the overcoat layer and signal electrodes are formed (step S4). This completes the wafer thin-film process for forming the magnetic head element provided with an MR effect element and an electromagnetic coil element in the wafer substrate.

Many magnetic head element patterns are formed in a matrix-shaped arrangement on the element forming surface of a head wafer on which the above-described wafer thin-film process is completed. The magnetic head element pattern is a portion which mainly becomes the magnetic head element and signal electrodes in an individual slider formed through a machine process which will be described later.

Next, this head wafer is adhered to a cutting separation jig using resin or the like, and is cut into row bars on each of which a plurality of magnetic head element patterns are aligned (step S5). Next, this row bar is adhered to a polishing jig using resin or the like, and the end surface which becomes the ABS side of this row bar is polished as an MR height process (step 6). This MR height process is performed until the magnetic head element is exposed out of the head end surface and the MR effect multilayer of the MR effect element obtains a predetermined MR height. A protective film made of, for example, diamondlike carbon (DLC) or the like is formed on the polished head end surface (step 7), the row bar after the formation of the protective film is then adhered to a rail forming jig using resin or the like, and a process for forming rails in ABS is performed by using a photolithography method and an ion beam etching method or the like (step 8). This row bar is then adhered to a cutting jig using resin or the like, a grooving process is performed, a cutting process is then performed and the row bar is separated into individual sliders (step 9). As shown above, the machine process for forming sliders is completed and the process of manufacturing the thin-film magnetic head is completed.

FIGS. 5a to 5f are cross-sectional views along an A-A line in FIG. 1, illustrating one embodiment of the forming process of the MR effect element and the electromagnetic coil element.

Figure 5A:
FIGS. 5a to 5f are cross-sectional views along an A-A line in FIG. 1, illustrating one embodiment of the forming process of the MR effect element and the electromagnetic coil element.

First, as shown in FIG. 5a, a base insulating layer 40 having a thickness of approximately 0.1 to 5 μm made of, for example, $Al_2O_3$ (alumina), $SiO_2$ (silicon dioxide) is formed on the slider substrate (wafer substrate) 11 formed of AlTiC ($Al_2O_3$—TiC) or the like by using, for example, a sputtering method. Next, a lower shield layer 330 having a thickness of approximately 0.5 to 3 μm made of NiFe, CoFeNi, CoFe, FeN or FeZrN or the like or a multilayer made of these materials is formed on the base insulating layer 40. An insulating film made of $Al_2O_3$, $SiO_2$ or the like is then formed using, for example, a sputtering method, and is planarized using a CMP method or the like and a planarized layer 41 is thereby formed.

Figure 5B:
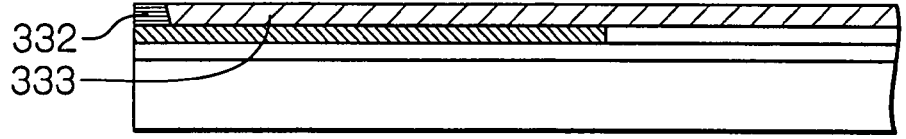

Next, as shown in FIG. 5b, an MR effect multilayer 332 and an insulating layer 333 are formed on the lower shield layer 330. Though not shown, a bias insulating layer and a bias layer may also be formed. When the MR effect multilayer 332 includes a TMR effect multilayered film, the MR effect multilayer 332 is formed by stacking an antiferromagnetic layer, a pinned layer whose magnetization is pinned by this antiferromagnetic layer, a tunnel barrier layer made of a non-magnetic dielectric material, and a free layer which forms tunnel exchange coupling with the pinned layer via this tunnel barrier layer, sequentially.

Figure 5C:
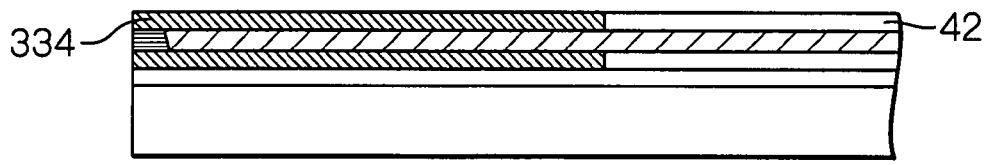

Next, as shown in FIG. 5c, an upper shield layer 334 having a thickness of approximately 0.5 to 3 μm made of, for example, NiFe, CoFeNi, CoFe, FeN or FeZrN or a multilayered film made of these materials is formed on the insulating layer 333 and the MR effect multilayer 332 by using, for example, a frame plating method. The formation of the MR effect element 33 is completed in the above described processes. An insulating film made of $Al_2O_3$, $SiO_2$ or the like is then formed by using, for example, a sputtering method, and is planarized by using a CMP method or the like, and a planarized layer 42 is thereby formed.

Figure 5D:
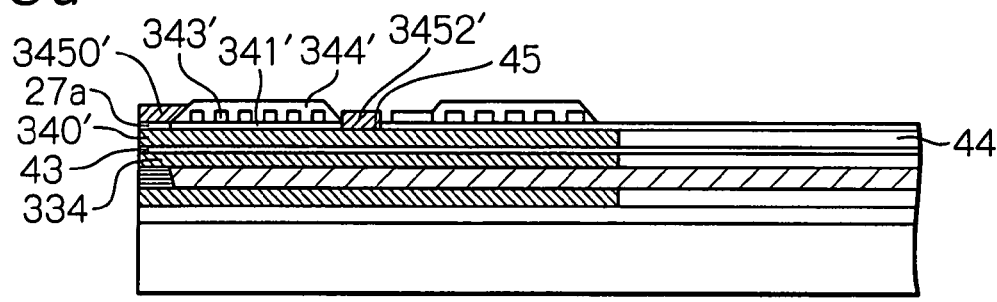

Next, as shown in FIG. 5d, a non-magnetic layer 43 having a thickness of approximately 0.1 to 0.5 μm made of an insulation material such as $Al_2O_3$, $SiO_2$, AlN or DLC or a metallic material such as Ti, Ta or Pt is formed on the upper shield layer 334 by using, for example, a sputtering method, chemical vapor deposition (CVD) method or the like to separate the MR effect element 33 from an electromagnetic coil element 34' which is formed later. Next, a lower magnetic pole layer 340' having a thickness of approximately 0.5 to 3 μm made of, for example, NiFe, CoFeNi, CoFe, FeN or FeZrN or a multilayered film made of these materials is formed on the non-magnetic layer 43, by using, for example, a frame plating method. Next, an insulating film of, for example, $Al_2O_3$, $SiO_2$ is formed by using, for example, a sputtering method, and is planarized by using, for example, a CMP method, and a planarized layer 44 is thereby formed.

Next, as shown in FIG. 5d likewise, a write gap layer 341' having a thickness of approximately 0.01 to 0.1 μm made of an insulating material such as $Al_2O_3$, $SiO_2$, AlN or DLC is formed using, for example, a sputtering method or CVD method. Next, part of the write gap layer 341' is removed through a resist mask pattern by using a dry etching method such as a milling method, a reactive ion etching (RIE) method, the lower magnetic pole layer 340' is thereby exposed and a back-gap portion 45 is formed. Next, a write coil layer 343' having a thickness of approximately 1 to 5 μm made of, for example, Cu is formed on the write gap layer 341' by using, for example, a frame plating method.

Next, as shown in FIG. 5d likewise, a coil insulating layer 344' having a thickness of approximately 0.5 to 7 μm made of a resist of heat-cured novolak or the like is formed so as to cover the coil layer 343' by using, for example, a photolithography method. Next, a write gap portion 27a made of an insulating material of $Al_2O_3$, $SiO_2$ or the like is formed on the lower magnetic pole layer 340' by using, for example, a sputtering method, and an upper magnetic pole layer 3450' and a back-contact magnetic pole layer 3452', having a thickness of approximately 0.5 to 3 μm made of NiFe, CoFeNi, CoFe, FeN or FeZrN or a multilayered film made of these materials are formed on the write gap portion 27a and the write gap layer 341' by using, for example, a frame plating method. Here, the formation of the write gap portion 27a and the upper magnetic pole layer 3450' is one of features of the present invention and will be explained in detail later.

Figure 5E:
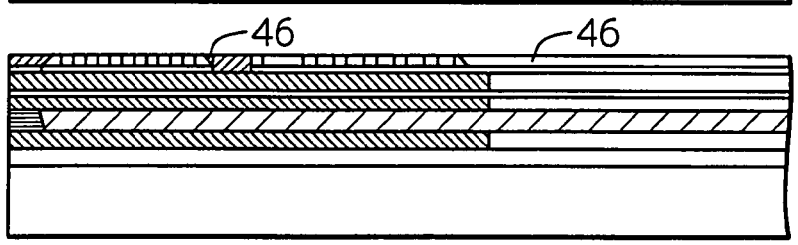
Figure 5F:
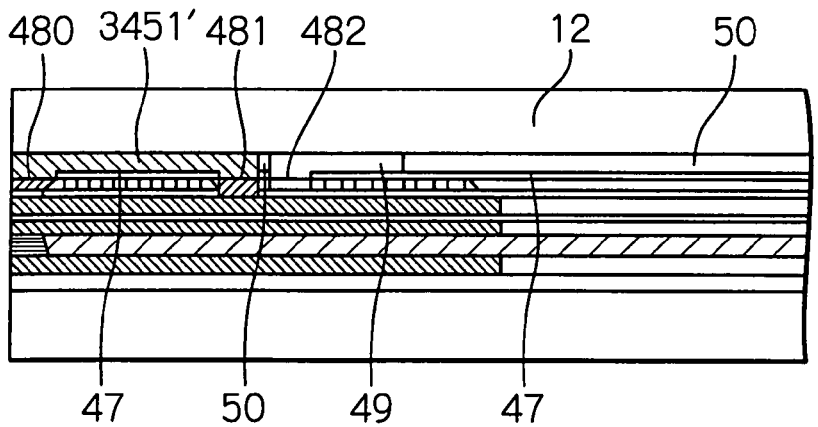

Next, as shown in FIG. 5e, an insulating film such as $Al_2O_3$, $SiO_2$ is formed by using, for example, a sputtering method, and is planarized using, for example, a CMP method to form a planarized layer 46. Next, as shown in FIG. 5f, an insulating layer 47 made of, for example, $Al_2O_3$, $SiO_2$ is formed by using, for example, a sputtering method and a CVD method. Next, an upper magnetic pole layer-yoke joint 480, a back-contact magnetic pole layer-yoke joint 481, and a coil lead portion 482 are formed by causing the base to expose through a resist mask pattern by using, for example, a milling method or an RIE method.

Next, as shown in FIG. 5f likewise, an upper yoke layer 3451' and a coil lead layer 49 having a thickness of approximately 0.5 to 3 μm made of, for example, NiFe, CoFeNi, CoFe, FeN or FeZrN or a multilayered film made of these materials are formed by using, for example, a frame plating method. However, the coil lead layer 49 may also be formed of a material such as Cu by using, for example, a frame plating method separately. The formation of the upper magnetic layer 345' is completed by forming the upper magnetic pole layer 3450', back-contact magnetic pole 3452' and upper yoke layer 3451' in the above described processes.

Next, an insulating film of $Al_2O_3$, $SiO_2$ or the like is formed by using, for example, a sputtering method and planarized by using, for example, a CMP method to thereby form a planarized layer 50. Next, an overcoat layer 12 made of, for example, $Al_2O_3$, $SiO_2$ is formed on this planarized surface by using, for example, a sputtering method. The formation process of the MR effect element and electromagnetic coil element is completed in this way.

The forming process of the head structure for longitudinal magnetic recording shown in FIG. 2b has been explained so far, but it is naturally possible to form the head structure under other forming conditions or modes and the head structure for perpendicular magnetic recording shown in FIG. 2a can also be formed in the same way by applying the above described forming method.

FIGS. 6a to 6d are schematic diagrams viewed from the head end surface 101 side, illustrating the forming process of the main magnetic pole layer of the electromagnetic coil element 34 for perpendicular magnetic recording in FIG. 2a.

Figure 6A:
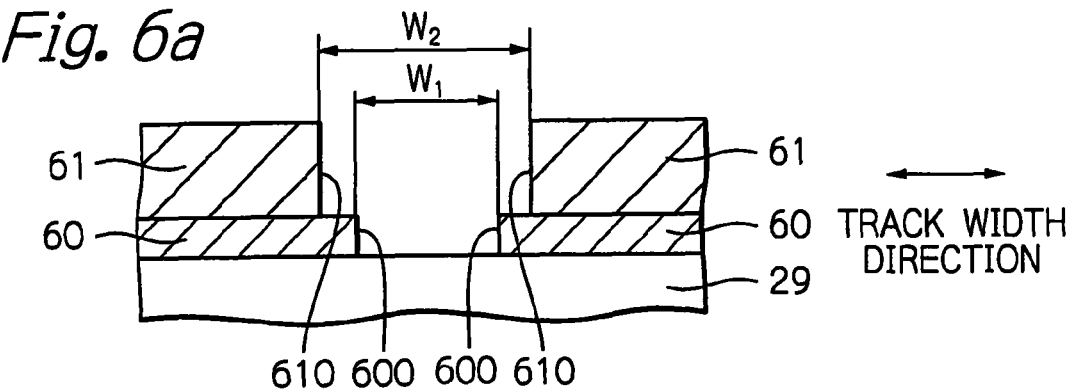

First, as shown in FIG. 6a, a second insulating layer 29 having a thickness of approximately 0.5 to 4 μm made of an insulating material such as $Al_2O_3$ or $SiO_2$ is formed so as to cover the backing coil portion (not shown) formed on the element forming surface (not shown) of the slider substrate by using, for example, a sputtering method. Next, a first frame layer 60 having a thickness $t_1$=1.5 to 2.0 μm made of an insulating material such as $Al_2O_3$, $SiO_2$ is formed by using, for example, a sputtering method. This first frame layer 60 has end surfaces 600 facing each other across a space having a width $W_1$ in the track width direction and the width $W_1$ is set to 5.5 to 6.5 μm.

A second frame layer 61 made of an insulating material such as $Al_2O_3$ or $SiO_2$ is formed on the first frame layer 60 by using, for example, a sputtering method. The second frame layer 61 has end surfaces 610 facing each other across a space having a width $W_2$ in the track width direction which is larger than the width $W_1$. The ratio of $W_2/W_1$ is set to be 1.1 to 1.5. Furthermore, the thickness $t_2$ of the second frame layer 61 is larger than the thickness $t_1$ of the first frame layer 60 and the ration of $t_2/t_1$ is set to be 1.2 to 2.3. Furthermore, the position of the second frame layer 61 is set such that the space having the width $W_2$ is located right above the space having the width $W_1$. As shown in FIG. 6a in this case, both of the space having the width $W_1$ and the space having the width $W_2$ are preferably set such that their axes of line symmetry coincide with each other on the cross-section including the track width direction. This setting secures the line symmetry of the main magnetic pole layer to be formed later.

When the ratio between width $W_2$ and width $W_1$ is $W_2/W_1$=1.1 to 1.5 and the ratio between the layer thicknesses $t_2$ and $t_1$ of the second and first frame layers is $t_2/t_1$=1.2 to 2.3, it has been experimentally confirmed that it is possible to form a trench having a bottom surface and having a minimum width $W_3$ which is smaller than the width $W_1$.

Figure 6B:
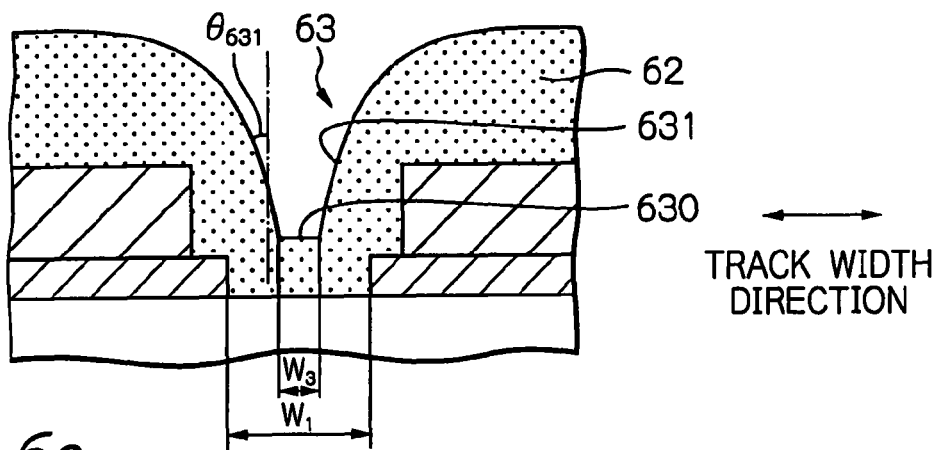

Next, as shown in FIG. 6b, a trench-forming film 62 made of an insulation material such as $Al_2O_3$ or $SiO_2$ is formed using, for example, a sputtering method so as to fill at least a part of the space having the width $W_1$ and space having the width $W_2$. Here, this trench-forming film 62 has a bottom surface 630, the position of which was in the space having the width $W_1$ or in the space having the width $W_2$, and formed is a trench 63 whose minimum width $W_3$ in the track width direction is smaller than the width $W_1$. Here, a wall 631 of the trench 63 is tilted at an angle $\theta_{631}$ with respect to the normal to the element forming surface.

The position of the bottom face 630 of the trench 63, minimum width $W_3$, and gradient $\theta_{631}$ can be set and adjusted by using the layer thicknesses of the first and second frame layers, values of the width $W_1$ and $W_2$, and the film thickness of the trench-forming film as parameters. Actually, as will be described in a practical example which will be described later, $W_3$=0.15 μm, which could not be achieved by using a conventional photolithography method, is realized and further it is sufficiently possible to expect up to $W_3$=0.05 μm. The gradient $\theta_{631}$ of the wall 631 of the trench 63 is the important amount that defines the cross-section of the reverse trapezoid of the formed main magnetic pole layer and the value of $\theta_{631}$ in the vicinity of the bottom surface 630 corresponds to a bevel angle.

Figure 6C:
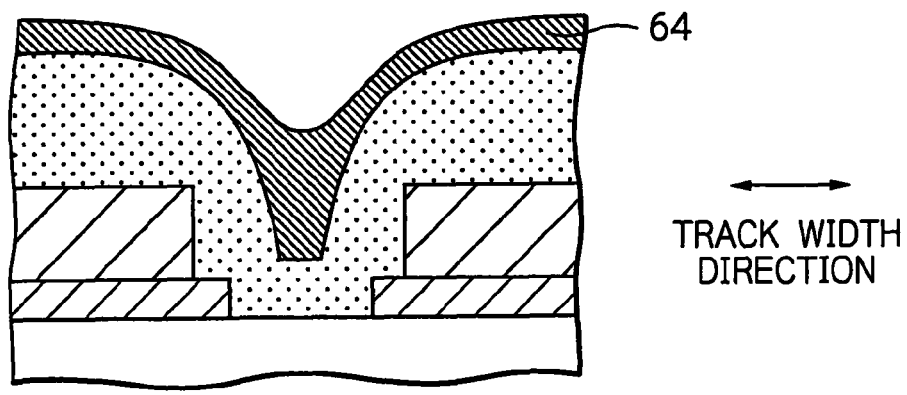

Next, as shown in FIG. 6c, a main magnetic pole film 64 which is a pattern film made of a soft magnetic material such as an alloy of any two or three of Ni, Fe and Co or an alloy whose principal components are these metals is formed so as to fill at least a part of the trench 63 by using, for example, a plating method or a sputtering method. In this case, the main magnetic pole film 64 is formed such that the thickness of the main magnetic pole film 64 filling the trench 63 is made to be a desired thickness or greater. Furthermore, when forming this film, it is preferable to apply a magnetic field in the track width direction to control and stabilize magnetic domains formed in the main magnetic pole film 64 and thereby to stabilize a writing characteristic. The magnetic field for controlling the magnetic domains is preferably a DC magnetic field of, for example, 800 to 1200 Oe (64 to 96 kA/m) and applied from outside of the slider substrate being manufactured.

Here, when the main magnetic pole film 64 is to be formed using a plating method, an electrode film is firstly formed on the trench-forming film 62 so as to cover the surface of the trench 63. As this electrode film, for example, a two-layered film (NiFe/Ti) can be used, which is made up of Ti having a thickness of approximately 5 nm and NiFe having a thickness of approximately 50 nm stacked sequentially by using a sputtering method. Using this electrode film as an electrode, for example, the main magnetic pole film 64 having a thickness of approximately 0.4 to 4 μm is formed by using a plating method. Using a plating method in this way facilitates application of the magnetic field during the above described film formation. That is, it is not necessary to consider any disturbance magnetic field other than that in the track width direction as in the case of sputtering, and it is easy to apply a magnetic field in the track width direction.

Figure 6D:
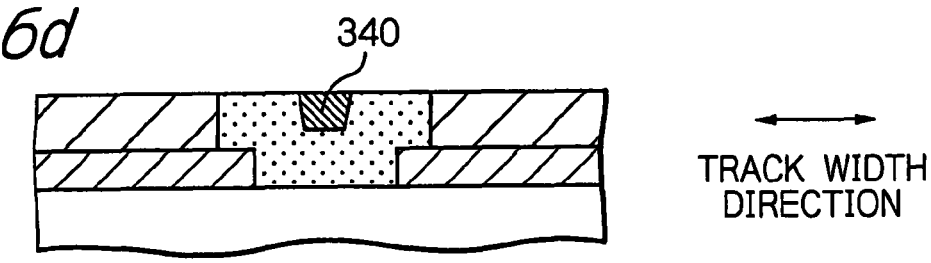

Next, as shown in FIG. 6d, the main magnetic pole film 64, and the trench-forming film 62, and further the second frame layer 61 in some cases, are polished using a CMP method to form a main magnetic pole layer 340 whose end surface on the trailing side is planarized, having a reverse trapezoidal cross-section.

The main magnetic pole layer formed using the above described forming method has the configuration on the head end surface shown in FIG. 3a, and by forming the first frame layer 60 and the second frame layer 61 made of a soft magnetic material in the process in FIG. 6a, it is possible to realize the configuration shown in FIG. 3b.

That is, the first frame layer 60 having a thickness $t_1$'=1.5 to 2.0 μm made of, for example, NiFe, CoFeNi, CoFe, FeN, FeZrN is formed on the second insulating layer 29 by using, for example, a frame plating method, and the second frame layer 61 made of, for example, NiFe, CoFeNi, CoFe, FeN, FeZrN is further formed by using, for example, a frame plating method. Here, suppose the same configuration as that described above in FIG. 6a is used for the space having the width $W_1$ and the space having the width $W_2$. Furthermore, the thickness $t_2$' of the second frame layer 61 is larger than the thickness $t_1$' of the first frame layer 60 and the ratio $t_2'/t_1'$ is set to be 1.2 to 2.3. This allows the side shield structure shown in FIG. 3b to be realized. As a result, the write field reaches a recording medium more straightforward and it is possible to prevent unnecessary writing to an adjacent track.

Furthermore, according to the manufacturing method including the formation of such a side shield structure, the main magnetic pole film 64 (FIG. 6c) is formed after forming the first and second frame layers 60 and 61 made of a soft magnetic material. Here, when a magnetic field for controlling magnetic domains is applied during the film formation of the main magnetic pole film 64, the first and second frame layers 60 and 61 formed beforehand play the role as the magnetic poles which sandwich the lower part of the main magnetic pole film 64 in the track width direction. This causes the magnetic field applied to the lower part of the main magnetic pole film 64 to align in the track width direction and have a sufficient intensity. As a result, it is possible to reliably and efficiently control magnetic domains of the main magnetic pole layer formed and thereby realize a stable writing characteristic.

As shown above, according to the manufacturing method explained by using FIGS. 6a to 6d, the minimum width $W_3$ of the trench 63 can be set to be much smaller than the width $W_1$ defined by the resolution of the exposure machine and the resist used. That is, it is eventually possible to form a main magnetic pole layer having a narrower track width than the resolution of the exposure machine and the resist used without depending on trimming by ion milling or the like. This makes it possible to manufacture a thin-film magnetic head for perpendicular magnetic recording in response to increasingly higher recording densities than the conventional one.

Furthermore, the gradient $\theta_{631}$ of the wall 631 of the trench 63 can be set to a desired value by adjusting the layer thickness of the first and second frame layers, values of the widths $W_1$ and $W_2$, and the film thickness of the trench-forming film as parameters. This allows the main magnetic pole layer to be formed into a reverse trapezoidal shape without depending on post-processing such as ion beam etching. As a result, it is possible to prevent unnecessary writing to an adjacent track generated by a skew angle of the head.

FIGS. 7a to 7d are schematic diagrams viewed from the head end surface 101 side, illustrating the forming process of the upper and lower magnetic pole layers in the magnetic coil element 34' for longitudinal magnetic recording in FIG. 2b.

Figure 7A:
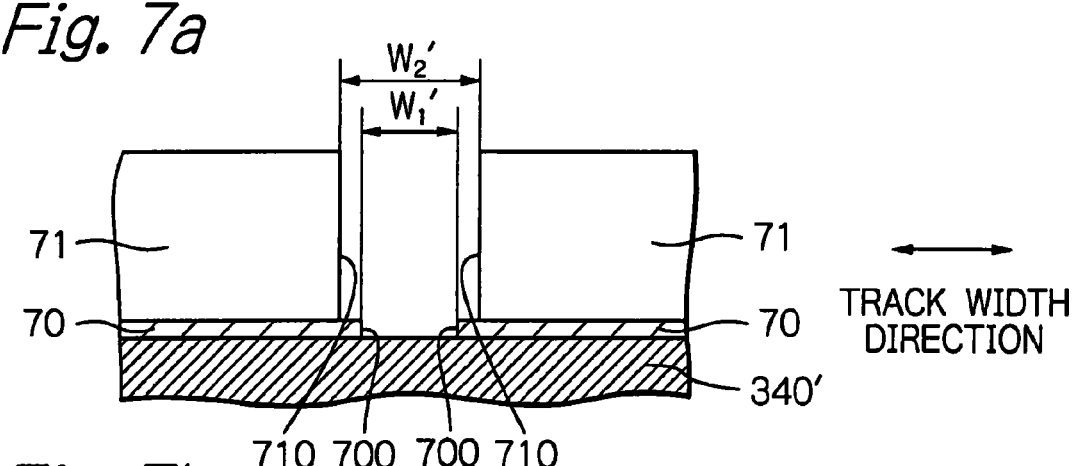
FIGS. 7a to 7d are schematic diagrams viewed from the head end surface side, illustrating the forming process of the upper and lower magnetic pole layers in the magnetic coil element for longitudinal magnetic recording in FIG. 2b.

First, as shown in FIG. 7a, a lower magnetic pole layer 340' having a thickness of approximately 0.5 to 3 μm made of, for example, NiFe, CoFeNi, CoFe, FeN or FeZrN or a multilayered film made of these materials is formed on/above the element forming surface (not shown) of the slider substrate, by using, for example, a frame plating method. Next, a first frame layer 70 made of an insulating material such as $Al_2O_3$ or $SiO_2$ is formed by using, for example, a sputtering method. This first frame layer 70 has end surfaces 700 facing each other across a space having a width $W_1$' in the track width direction.

A second frame layer 71 made of an insulating material such as $Al_2O_3$ or $SiO_2$ is formed on the first frame layer 70 by using, for example, a sputtering method. The second frame layer 71 has end surfaces 710 facing each other across a space having a width $W_2'$ larger than the width $W_1'$ in the track width direction and the thickness thereof is set to be larger than the thickness of the first frame layer 70. Furthermore, the position of the second frame layer 71 is set such that the space having the width $W_2'$ is located right above the space having the width $W_1'$. In this case, as shown in FIG. 6a, both of the space having the width $W_1$ and space having the width $W_2$ are preferably set such that the axes of line symmetry coincide with each other on the cross-section including the track width direction. This setting secures the line symmetry of an upper magnetic pole layer to be formed later.

Figure 7B:
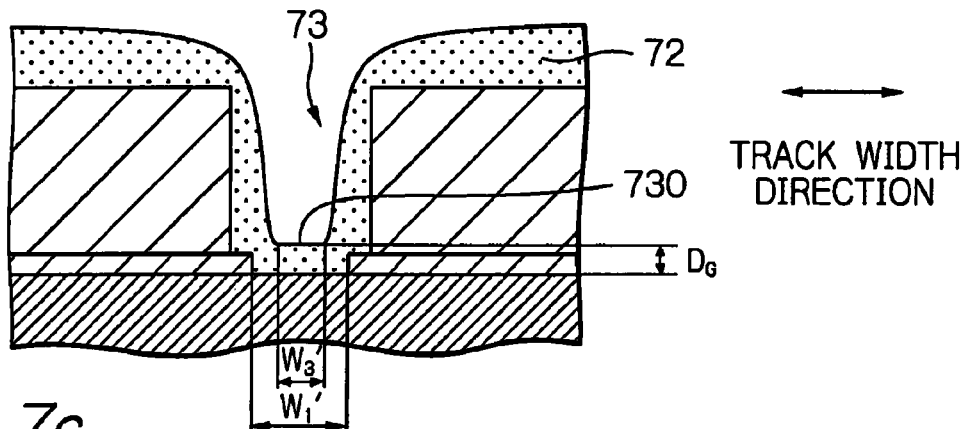

Next, as shown in FIG. 7b, a trench-forming film 72 made of an insulating material such as $Al_2O_3$ or $SiO_2$ is formed so as to fill a part of the space having the width $W_1$ and space having the width $W_2$ by using, for example, a sputtering method. Here, the trench-forming film 72 has a bottom face 730 right above the lower magnetic pole layer 340', and a trench 73 is formed, whose minimum width $W_3'$ in the track width direction is smaller than the width $W_1'$. The distance $D_G$ (that is, the film thickness of the trench-forming film 72 at the bottom face 730) between the bottom surface 730 of the trench 73 and the lower magnetic pole layer 340' is equivalent to the write gap length. The minimum width $W_3'$ of such a trench 73 and the distance $D_G$ can be set and adjusted by using the layer thicknesses of the first and second frame layers, values of width $W_1$ and width $W_2$, and the film thickness of the trench-forming film as parameters.

Figure 7C:
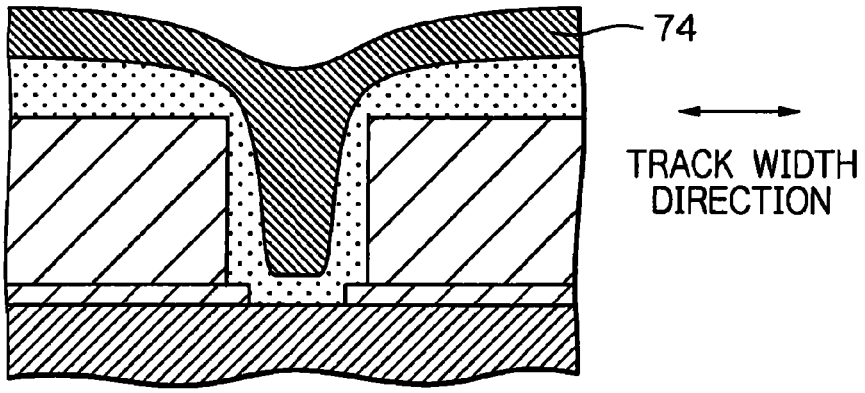

Next, as shown in FIG. 7c, an upper magnetic pole film 74 which is a pattern film made of a soft magnetic material such as NiFe, CoFeNi, CoFe, FeN, FeZrN is formed so as to fill at least a part of the trench 73 by using, for example, a sputtering method. In this case, the film is formed such that the thickness of the upper magnetic pole film 74 that fills the trench 73 is equal to or greater than a desired thickness of the upper magnetic pole layer formed.

Figure 7D:
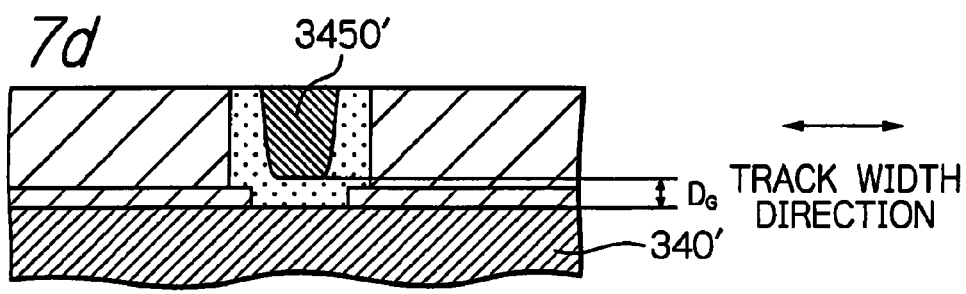

Next, as shown in FIG. 7d, the upper magnetic pole film 74, the trench-forming film 72 or the second frame layer 71 in some cases are polished using a CMP method to form an upper magnetic pole layer 3450' located at a distance of the write gap length $D_G$ from the lower magnetic pole layer 340'. The upper and lower magnetic pole layers formed as shown above have the constructions shown in FIG. 3(C) on the head end surface.

According to the manufacturing method explained above by using FIGS. 7a to 7d, it is possible to set the minimum width $W_3'$ of the trench 73 to be smaller than the width $W_1'$ defined by the resolution of the exposure machine and the resist used. That is, it is possible to form the upper magnetic pole layer having a narrower track width than the resolution of the exposure machine and the resist used without depending on trimming by ion milling or the like. This makes it possible to manufacture a thin-film magnetic head for longitudinal magnetic recording in response to increasingly higher recording densities than the conventional one.

In the forming method of the magnetic pole layer explained in FIG. 6 and FIG. 7, two frame layers, one stacked on the other, are adopted to form the trench. Here, when there is only one frame layer, the bottom of the trench becomes sharp-pointed and no bottom surface is formed. The end surface on the leading side of the magnetic pole layer corresponding to this bottom surface is an important portion that determines the intensity and distribution of the write field and should be formed reliably with a predetermined area. Therefore, using the first and second frame layers, one stacked on the other as frame layers, is very important in producing the effects of the present invention. It is also possible to use three or more frame layers stacked, and the use of the three or more frame layers can also fall within the scope of the present invention. However, the size and shape of the vicinity of the bottom surface of the trench can be sufficiently controlled by the setting of the first and second frame layers.

Practical Example

Hereinafter, an practical example will be shown to explain the effect of the present invention.

First, a thin-film magnetic head was formed by using the manufacturing method of the present invention shown in FIGS. 6a to 6d. An AlTiC substrate was used for the slider substrate. The first frame layer and the second frame layer were formed by stacking $Al_2O_3$ using a sputtering method, and then patterning the spaces with width $W_1$ and width $W_2$ respectively by using a photolithography method. The trench-forming film was formed by stacking $Al_2O_3$ by using a sputtering method. The main magnetic pole film made of an alloy of NiFeCo was formed by using a sputtering method.

Figure 8:
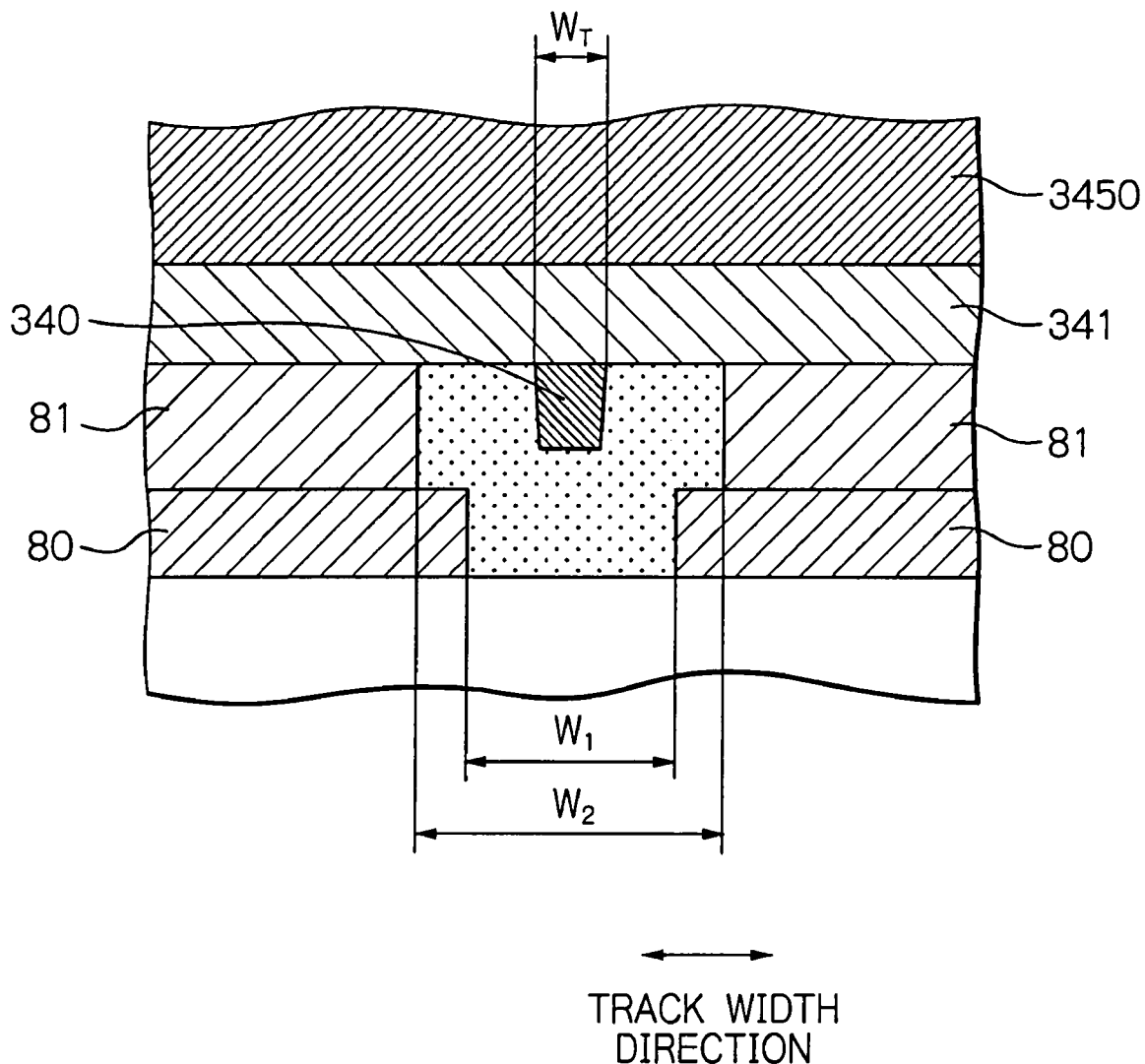
FIG. 8 is a schematic diagram showing the result of an observation of the configuration in the vicinity of the main magnetic pole layer on the head end surface on the ABS side of the thin-film magnetic head manufactured by using the manufacturing method according to the present invention.

FIG. 8 is a schematic diagram showing the result of an observation of the configuration in the vicinity of the main magnetic pole layer on the head end surface on the ABS side of the thin-film magnetic head manufactured by using the manufacturing method according to the present invention. Here, the observation was performed by using a SEM and length measurements of each part was also conducted by using the observation result.

According to FIG. 8, it is appreciated that this thin-film magnetic head is a head for perpendicular magnetic recording with the main magnetic pole layer 340 and the trailing shield portion 3450 of the auxiliary magnetic pole layer formed facing each other across the gap layer 341. Here, the thickness of the first frame layer 80 was 1.90 μm and the width $W_1$ of the space sandwiched by the first frame layers 80 was 5.50 μm. Furthermore, the thickness of the second frame layer 81 was 3.00 μm and the width $W_2$ of the space sandwiched by the second frame layers 81 was 6.50 μm.

According to FIG. 8, the main magnetic pole layer 340, formed under the condition of the existence of the first and second frame layers with the width values of $W_1$ and $W_2$ respectively, have a reverse trapezoidal shape in which the edge on the trailing side becomes longer on the head end surface. Here, the length $W_T$ of this edge corresponding to the track width was measured to be 0.15 μm. This is smaller than 0.2 μm which is the resolution of the exposure machine and the resist used, and is realized without performing etching process such as a milling as a post-processing at all.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A forming method of a soft-magnetic pattern film with a narrower width, comprising the steps of:
    forming a base layer on/above an element forming surface of a substrate;
    forming a first frame layer having end surfaces facing each other across a space having a width $W_1$ on said base layer;
    forming a second frame layer having end surfaces facing each other across a space having a width $W_2$ in the same direction as said width $W_1$ which is larger than said width $W_1$, said space having said width $W_2$ being located right above said space having said width $W_1$;

forming a trench-forming film provided with a trench having a minimum width $W_3$ which is smaller than said width $W_1$ in the same direction as said width $W_1$ so as to fill at least a part of said space having said width $W_1$ and said space having said width $W_2$;

forming a pattern film made of a soft-magnetic material so as to fill at least a part of said trench; and polishing said pattern film to form said soft-magnetic pattern film.

2. A manufacturing method of a thin-film magnetic head, comprising the steps of:

forming a base layer on/above an element forming surface of a substrate;

forming a first frame layer made of a non-magnetic material, having end surfaces facing each other across a space having a width $W_1$ in a track width direction on said base layer;

forming a second frame layer made of a non-magnetic material, having end surfaces facing each other across a space having a width $W_2$ in the track width direction which is larger than said width $W_1$, said space having said width $W_2$ being located right above said space having said width $W_1$;

forming a trench-forming film made of a non-magnetic material, provided with a trench having a minimum width $W_3$ in the track width direction which is smaller than said width $W_1$ so as to fill at least a part of said space having said width $W_1$ and said space having said width $W_2$;

forming a pattern film made of a soft magnetic material so as to fill at least a part of said trench; and polishing said pattern film by using a chemical mechanical polishing method to form a main magnetic pole layer.

3. The manufacturing method as claimed in claim 2, wherein said first frame layer, said second frame layer and said trench-forming film are formed by depositing Alumina or silicon dioxide with a sputtering method.

4. The manufacturing method as claimed in claim 2, wherein a ratio $W_2/W_1$ of said width $W_2$ and said width $W_1$ is not less than 1.1 and not more than 1.5, and a ratio $t_2/t_1$ of a layer thickness $t_2$ of said second frame layer and a layer thickness $t_1$ of said first frame layer is not less than 1.2 and not more than 2.3.

5. A manufacturing method of a thin-film magnetic head, comprising the steps of:

forming a base layer made of a soft magnetic material on/above an element forming surface of a substrate to provide a lower magnetic pole layer;

forming a first frame layer made of a non-magnetic material, having end surfaces facing each other across a space having a width $W_1$ in a track width direction on said base layer;

forming a second frame layer made of a non-magnetic material, having end surfaces facing each other across a space having a width $W_2$ in the track width direction which is larger than said width $W_1$, said space having said width $W_2$ being located right above said space having said width $W_1$;

forming a trench-forming film made of a non-magnetic material, provided with a trench having a minimum width $W_3$ in the track width direction which is smaller than said width $W_1$ so as to fill at least a part of said space having said width $W_1$ and said space having said width $W_2$, a portion on said lower magnetic pole layer of said trench-forming film provided as a write gap portion;

forming a pattern film made of a soft magnetic material so as to fill at least a part of said trench; and polishing said pattern film by using a chemical mechanical polishing method to form a upper magnetic pole layer.

6. The manufacturing method as claimed in claim 5, wherein said first frame layer, said second frame layer and said trench-forming film are formed by depositing alumina or silicon dioxide with a sputtering method.

* * * * *